United States Patent
Wu et al.

(10) Patent No.: US 12,135,401 B1
(45) Date of Patent: Nov. 5, 2024

(54) ESTIMATION METHOD OF DETECTING ELEVATION BY SEMI-AIRBORNE ELECTROMAGNETIC METHOD

(71) Applicant: Institute of Geology and Geophysics, Chinese Academy of Sciences, Beijing (CN)

(72) Inventors: Xin Wu, Beijing (CN); Guoqiang Xue, Beijing (CN); Yanbo Wang, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/412,075

(22) Filed: Jan. 12, 2024

(30) Foreign Application Priority Data

Nov. 14, 2023 (CN) .......................... 202311508985.4

(51) Int. Cl.
*G01V 3/38* (2006.01)
*G01V 3/12* (2006.01)

(52) U.S. Cl.
CPC . *G01V 3/38* (2013.01); *G01V 3/12* (2013.01)

(58) Field of Classification Search
CPC .................................. G01V 3/38; G01V 3/12
USPC .......................................................... 324/332
See application file for complete search history.

(56) References Cited

U.S. PATENT DOCUMENTS

| 2017/0060132 A1 | 3/2017 | Chung et al. | |
| 2019/0204467 A1* | 7/2019 | Curt | E21B 47/13 |
| 2022/0113443 A1* | 4/2022 | Cole | G01V 3/38 |
| 2023/0383643 A1* | 11/2023 | Wu | G01V 3/30 |

FOREIGN PATENT DOCUMENTS

| AU | 2020101108 A | 7/2020 |
| CN | 109459705 A | 3/2019 |
| CN | 111766632 A | 10/2020 |
| CN | 116361616 A | 6/2023 |

OTHER PUBLICATIONS

Zhou Bo et al., "Real-time 3D Outdoor Environment Modeling for Mobile Robot with a Laser Scanner", Robot, vol. 34, No. 3, pp. 321-336, May 5, 2012 (abstract translated).
Notification to Grant Patent Right for Invention dated May 27, 2024 from SIPO application No. 202311508985.4.
Search report dated May 11, 2024 from SIPO application No. 202311508985.4.

* cited by examiner

*Primary Examiner* — Raul J Rios Russo
(74) *Attorney, Agent, or Firm* — Pilloff Passino & Cosenza, LLP; Rachel Pilloff; Sean Passino (57) ABSTRACT

The application provides an estimation method of detecting elevation by a semi-airborne electromagnetic method, including the following steps: S1, judging original elevation data to obtain wrong point data and normal data; S2, filtering the wrong point data by an improved Kalman filtering method, and filtering the normal data by a conventional Kalman filtering method; S3, fusing a filtering result of the wrong point data and a filtering result of the normal data, and taking a fused result as a measured value sequence used in a next working process; and S4, repeating the S1-S3 until the fused result meets preset requirements.

3 Claims, 7 Drawing Sheets

ESTIMATION METHOD OF DETECTING ELEVATION BY SEMI-AIRBORNE ELECTROMAGNETIC METHOD

CROSS-REFERENCE TO RELATED APPLICATIONS

This application claims priority to Chinese Patent Application No. 202311508985.4, filed on Nov. 14, 2023, the contents of which are hereby incorporated by reference.

TECHNICAL FIELD

The application belongs to that technical field of geophysical exploration, and in particular relates to an estimation method of detecting elevation by a semi-airborne electromagnetic method.

BACKGROUND

Figure 1:
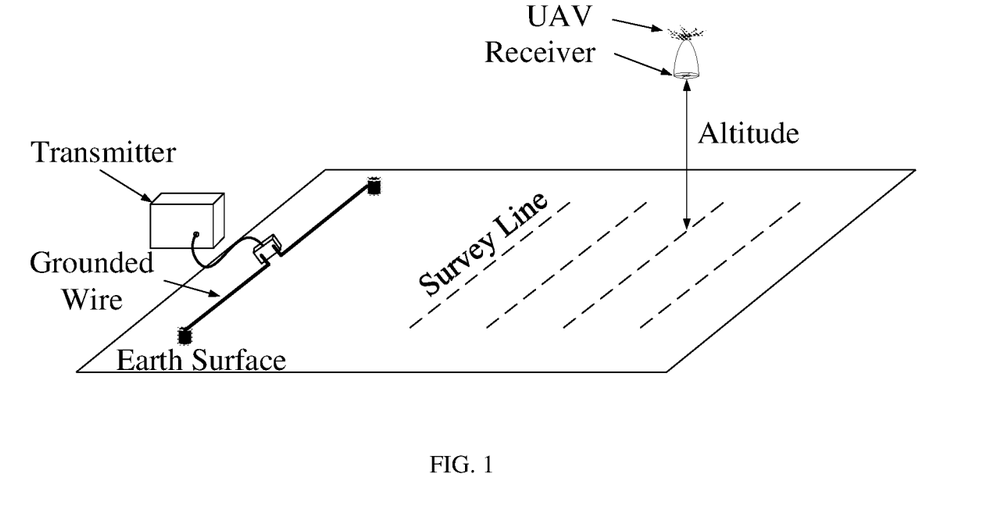
FIG. 1 is a schematic diagram of the semi-airborne electromagnetic method.

Electromagnetic method (EM) is a widely used geophysical electromagnetic detection method, which obtains underground electrical information by observing the electromagnetic response excited by natural or artificial sources. In practical field work, it is difficult for conventional ground detection methods to be carried out quickly in desert, gobi, complex terrain and vegetation coverage areas. In order to overcome the above construction difficulties and give consideration to the larger detection depth, the researchers arranged the emission source on the ground and mounted the receiver on the flight platform, thus producing the semi-airborne electromagnetic method (SAEM), as shown in FIG. 1.

Figure 2:
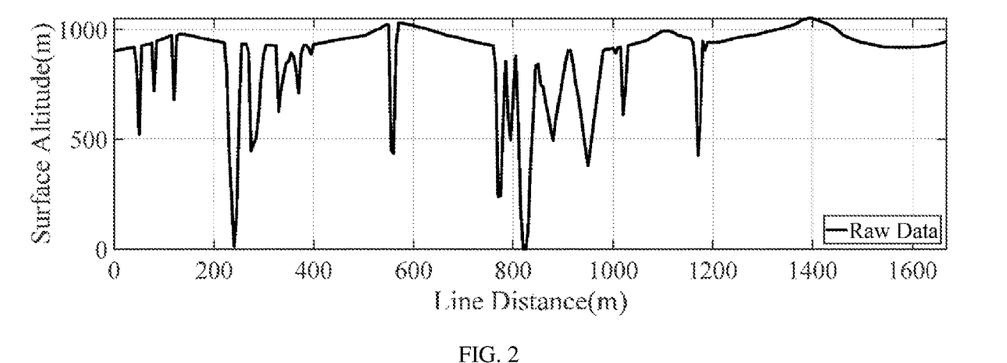
FIG. 2 is a schematic diagram of elevation data obtained by temporary surveying and mapping.

The receiver of SAEM detection is in the air, so the height above the ground of the receiver is an important parameter for inversion when processing semi-airborne electromagnetic data. In practical exploration, in order to ensure the navigation safety of unmanned aerial vehicles, the mode of flying at a fixed altitude is usually adopted, so the height of the receiver from the ground may be obtained by subtracting the surface elevation from the GPS elevation of the receiver. However, for many areas, there is no ready-made high-precision surface elevation model, and it is often necessary to obtain surface elevation data through open channels or small low-cost equipment based on rangefinders. However, the data obtained by this method often has some data defects, which leads to the wrong points in the elevation model obtained along the survey line, as shown in FIG. 2. The existence of wrong points makes the elevation model unable to be used directly, which further affects the inversion. This is a problem that needs to be solved when SAEM is used in complex terrain areas.

Figure 3:
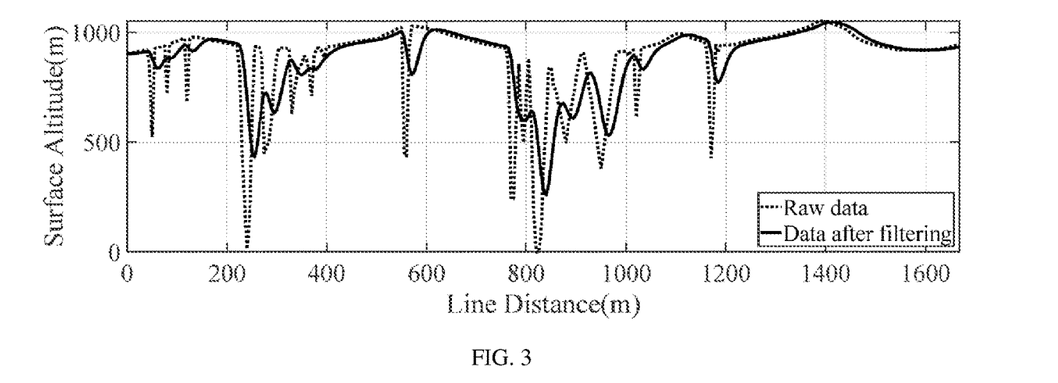
FIG. 3 is a schematic diagram of the processing result of conventional Kalman filtering.
Figure 4:
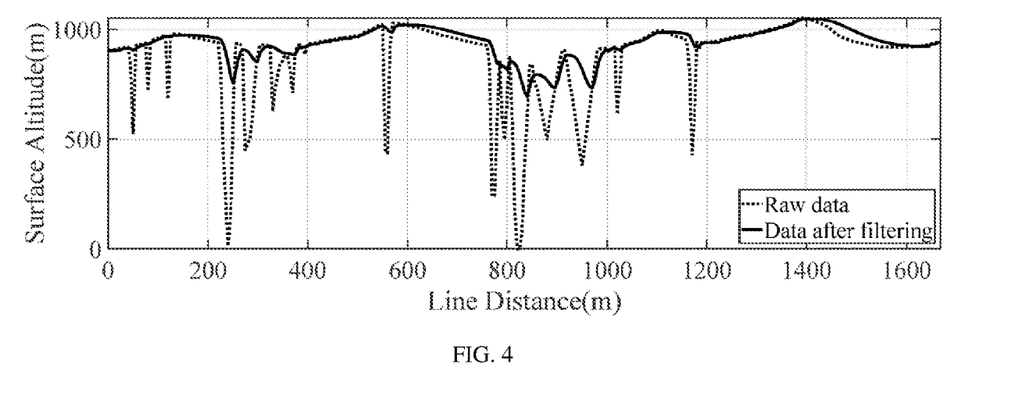
FIG. 4 is a schematic diagram of the processing result of a robust Kalman filtering.

The data collected and measured by this kind of sensor carries noise interference, which is usually removed by filtering operation in engineering application. The conventional Kalman filtering method needs to be based on accurate model and known statistical characteristics of interference signals. However, for the problem of elevation estimation, the statistical characteristics of the wrong points in the measured data are unknown, which makes the conventional Kalman filtering algorithm lose its optimality and greatly reduces the estimation accuracy, as shown in FIG. 3. Therefore, a robust Kalman filtering method is needed. At present, a common class of robust Kalman filters is aimed at heavy-tailed additive outliers. A common method of this kind of filters is to directly embed a decision factor in the original filtering process to determine the wrong point, and then adjust the filtering process of the wrong point. This simple improvement is applicable when there are few wrong points, but when there are many wrong points or the distribution of wrong points is complicated, the robustness will decrease rapidly, as shown in FIG. 4. Therefore, in view of the actual situation in the field, based on the conventional Kalman filtering, it is urgent to design a fast filtering method, which may quickly process the elevation observation data with poor performance in the field.

SUMMARY

In order to solve the above technical problems, the application provides an estimation method of detecting elevation by a semi-airborne electromagnetic method, which realizes the effective estimation of surface elevation under the background of poor quality of original elevation data and few references, and lays a good data foundation for subsequent data processing and inversion interpretation.

In order to achieve the above objective, the application provides an estimation method of detecting elevation by a semi-airborne electromagnetic method, including the following steps:

S1, judging original elevation data to obtain wrong point data and normal data;

S2, filtering the wrong point data by an improved Kalman filtering method, and filtering the normal data by a conventional Kalman filtering method;

S3, fusing a filtering result of the wrong point data and a filtering result of the normal data, and taking a fused result as a measured value sequence used in a next working process; and S4, repeating the S1-S3 until the fused result meets preset requirements, and completing an effective estimation of a surface elevation.

Optionally, judging the original elevation data includes:

judging the original elevation data from a first to a last and from the last to the first of a survey line by using a judging index method based on a Mahalanobis distance, and respectively obtaining wrong point data sets $A^{forward}$ and $A^{inverse}$;

fusing the wrong point data sets $A^{forward}$ and $A^{forward}$, taking an intersection of the two data sets as the wrong point data, and taking data except the wrong point data in the original elevation data as the normal data.

Optionally, obtaining the wrong point data sets includes:

judging the original elevation data by using the judging index method based on the Mahalanobis distance to obtain a judging index result;

comparing the judging index result with a preset threshold, and when the judging index result is greater than the preset threshold, marking an original datum corresponding to the judging index result greater than the preset threshold as a wrong point to obtain an initial wrong point data set;

performing a constraint processing on the initial wrong point data set to obtain the wrong point data set.

Optionally, a judging index based on Mahalanobis distance is:

$$\tilde{y}_k = ((\tilde{y}_k - \hat{y}_k^-)^T (P_{\tilde{y}_k}^-)^{-1}(\tilde{y}_k - \hat{y}_k^-))^2 = (\tilde{y}_k - \hat{y}_k^-)^T (P_{\tilde{y}_k}^-)^{-1} (\tilde{y}_k - \hat{y}_k^-)$$

where $\tilde{y}_k$ is the judging index, $\tilde{y}_k$ is an actual measured value of the elevation, $\tilde{y}_k^-$ is a predicted measured value of the elevation, and $P_{\tilde{y}_k}^-$ is a covariance of $\hat{y}_k^-$.

Optionally, the improved Kalman filtering method is:

$$\bar{P}_{\tilde{y}_k^-} = \kappa_k P_{\tilde{y}_k^-}$$

$$P_k^+ = (I - K_k H_k) P_k^- (I - K_k H_k)^T + K_k \bar{R}_k K_k^T$$

$$\kappa_k = \begin{cases} 1 & \text{if } \tilde{y}_k \le \chi \\ \left(\dfrac{\tilde{y}_k}{\chi}\right)^n (n = 1, 2, 3 \ldots) & \text{else} \end{cases}$$

$$\bar{R}_k = \bar{P}_{\tilde{y}_k^-} - H_k P_k^- H_k^T = (\kappa_k - 1) H_k P_k^- H_k^T + \kappa_k R_k$$

where $\bar{P}_{\tilde{y}_k}^-$ is a covariance of an adjusted observation and prediction value, $K_k$ is an adjusting coefficient, $P_k^+$ is a covariance of a posterior estimation value, $K_k$ is a Kalman filtering coefficient, $H_k$ is an observation matrix, $P_k^-$ is a covariance between a real value and a prediction value, $\bar{R}_k$ is a calculated auxiliary parameter of $P_k^+$, $K_k^T$ is a transposition of the Kalman filtering coefficient, $\tilde{y}_k$ is the judging index, $\chi$ is the preset threshold, $H_k^T$ is a transposition of the observation matrix, and $R_k$ is a covariance of the observation noise matrix.

Optionally, fusing the filtering result of the wrong point data and the filtering result of the normal data includes:

by using the improved Kalman filtering method, filtering the wrong point data from the first to the last and from the last to the first of the survey line respectively to obtain a first filtering result and a second filtering result, respectively;

by using a conventional Kalman filtering method, filtering the normal data from the first to the last and from the last to the first of the survey line respectively to obtain a third filtering result and a fourth filtering result;

forming a first set $\hat{X}^{forward}$ based on the first filtering result and the third filtering result;

forming a second set $\hat{X}^{inverse}$ based on the second filtering result and the fourth filtering result;

fusing and averaging the first set and the second set to obtain the fused result $\hat{X}^{avg}$.

Compared with the prior art, the application has the following advantages and technical effects.

The estimation method of elevation disclosed by the application realizes the effective estimation of the surface elevation under the background of poor quality of original elevation data and few references, and lays a good data foundation for subsequent data processing and inversion interpretation.

BRIEF DESCRIPTION OF THE DRAWINGS

The accompanying drawings, which constitute a part of this application, are used to provide a further understanding of this application. The illustrative embodiments of this application and their descriptions are used to explain this application, and do not constitute an improper limitation of this application. In the attached drawings.

DETAILED DESCRIPTION OF THE EMBODIMENTS

It should be noted that the embodiments in this application and the features in the embodiments may be combined with each other without conflict. The present application will be described in detail with reference to the attached drawings and embodiments.

It should be noted that the steps shown in the flowchart of the accompanying drawings may be executed in a computer system with a set of computer-executable instructions, and although the logical order is shown in the flowchart, in some cases, the steps shown or described may be executed in a different order from here.

This embodiment puts forward an effective estimation method of detecting elevation by a semi-airborne electromagnetic method. The method mainly includes the following steps.

Step 1, the original elevation data are judged by using a judging index based on Mahalanobis distance, and the wrong point data set is obtained. The judging process is as follows:

firstly, the judging index is calculated aiming at the original data points:

$$\tilde{y}_k = ((\tilde{y}_k - \hat{y}_k^-)^T (P_{\tilde{y}_k^-})^{-1})(\tilde{y}_k - \hat{y}_k^-))^2 = (\tilde{y}_k - \hat{y}_k^-)^T (P_{\tilde{y}_k^-})^{-1} (\tilde{y}_k - \hat{y}_k^-)$$

then $\tilde{y}_k$ is compared with the preset threshold $\chi$, and if $\tilde{y}_k$ is greater than $\chi$, the point is marked as a wrong point.

Step 2, in order to improve the accuracy of judgment, the original data are judged from a first to a last and from the last to t he first of the survey line, and the wrong point data sets $A^{forward}$ and $A^{inverse}$ are obtained respectively. The results of bilateral judgment are fused, and the intersection O of two data sets is taken and recorded as the real wrong point data set. Sometimes it is difficult to find an appropriate threshold. A reasonable means is to select a smaller threshold to make a preliminary judgment, and then prior information is used to further constrain the obtained data set (for example, the elevation of the wrong point is often lower, so an elevation threshold may be taken, and the one less than the elevation threshold is the wrong point). This means additionally incorporates prior information and has higher accuracy.

Step 3, the adjusted Kalman filtering method is used for wrong points, and the conventional Kalman filtering method is still used for normal data. The specific adjustment of the Kalman filtering method used for the wrong points is as follows:

$$\bar{P}_{\tilde{y}_k^-} = \kappa_k P_{\tilde{y}_k^-}$$

$$P_k^+ = (I - K_k H_k) P_k^- (I - K_k H_k)^T + K_k \bar{R}_k K_k^T$$

$$\kappa_k = \begin{cases} 1 & \text{if } \tilde{y}_k \le \chi \\ \left(\dfrac{\tilde{y}_k}{\chi}\right)^n (n = 1, 2, 3 \ldots) & \text{else} \end{cases}$$

$$\bar{R}_k = \bar{P}_{\tilde{y}_k^-} - H_k P_k^- H_k^T = (\kappa_k - 1) H_k P_k^- H_k^T + \kappa_k R_k$$

Step 4, similarly, based on the analysis described in step 3, the original data (at this time, the wrong point and normal data have been distinguished) are filtered from the first to the last and from the last to the first of the survey line, and the filtering results $\hat{X}^{forward}$ (the set of the first filtering result and the third filtering result) and $\hat{X}^{inverse}$ (the set of the second filtering result and the fourth filtering result) are obtained respectively. The results of bilateral filtering are fused (generally averaged) to get $\hat{X}^{avg}$, which will be used as the measured value sequence $\tilde{Y}$ for the next working process.

Figure 5:
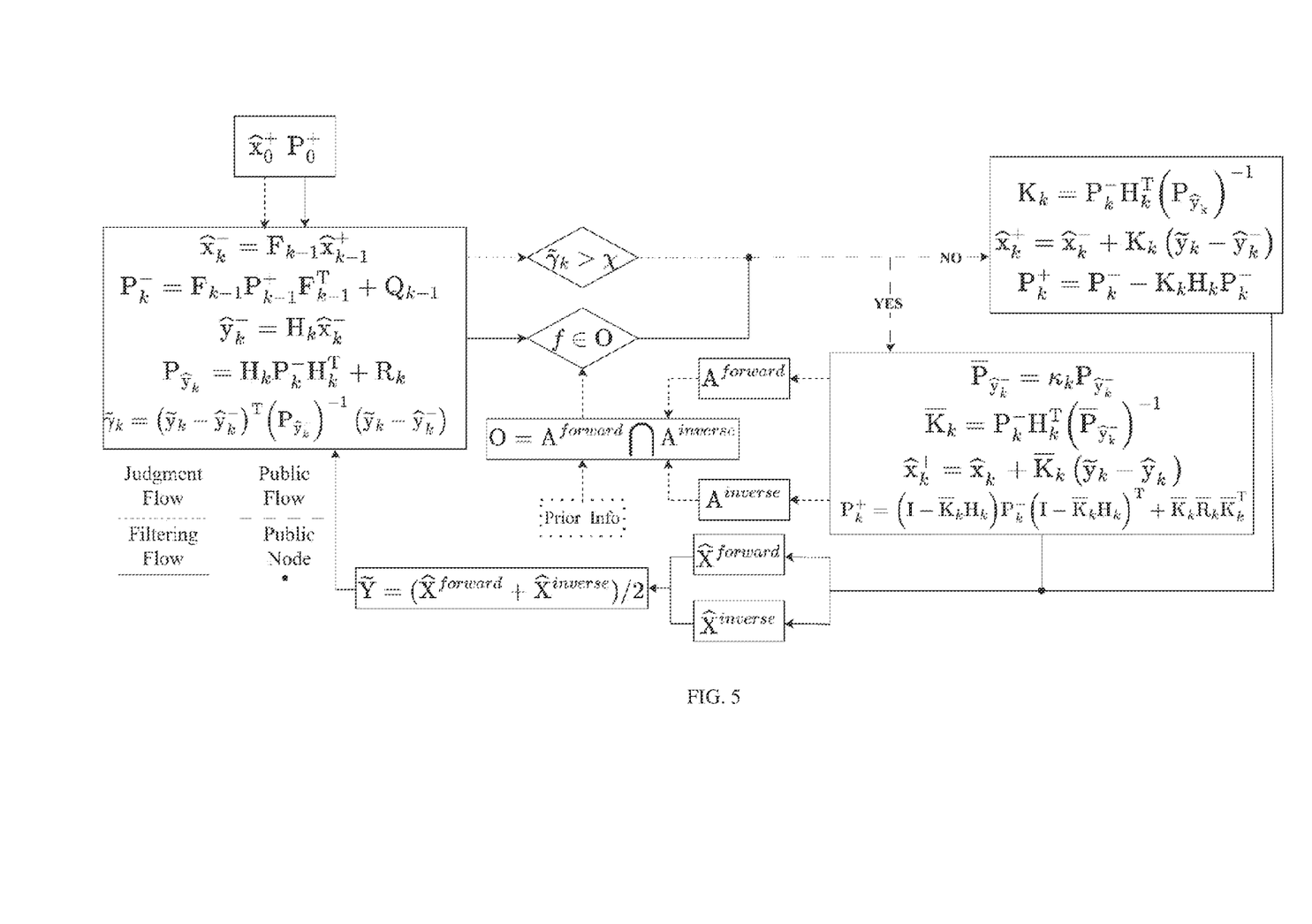
FIG. 5 is a schematic diagram of the working process of robust Kalman filtering according to an embodiment of the present application.

Step 5, the above steps are repeated until the obtained result $\hat{X}^{avg}$ meets the requirements (for example, there are no more wrong points in the data), and the detailed process is shown in FIG. 5. $\hat{x}_0^+$ and $P_0^+$ are the initial set values, which are used to start the whole working process. Firstly, the wrong point data set O is obtained by the judgement flow. It should be noted that the filtering process in the judgement flow is only used to drive the judgement flow, and the prior information may further constrain the data set obtained by the judging. After that, the original data is filtered by the filtering flow, and the adjusted Kalman filtering method is used for the filtering processing of the wrong point data set, and the conventional Kalman filtering method is used for the filtering processing of the normal data.

Figure 6:
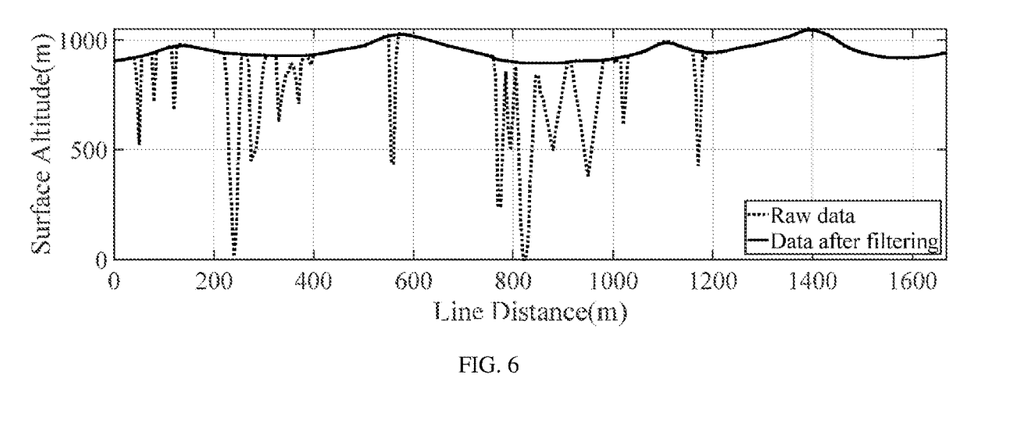
FIG. 6 is a schematic diagram of the processing result of a working process of robust Kalman filtering according to an embodiment of the present application.
Figure 7:
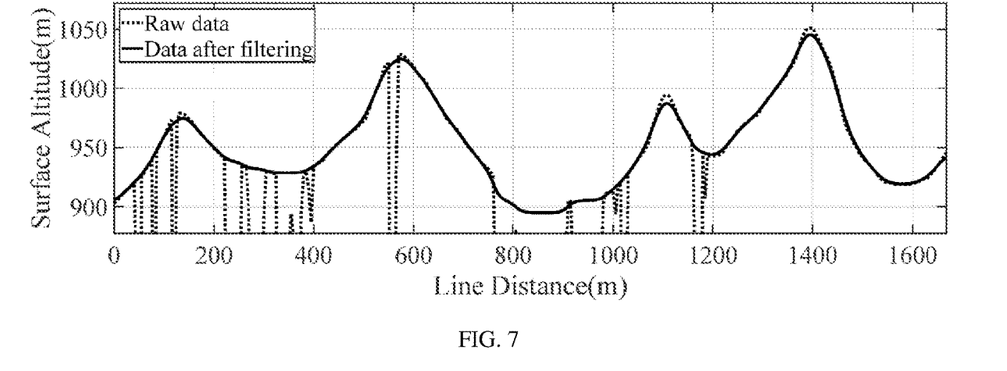
FIG. 7 is a detailed schematic diagram of the processing result of the working process of robust Kalman filtering according to the embodiment of the present application.

Taking the measured elevation data in FIG. 2 as an example, the wrong points in the original data may be simply divided into two types, one is scattered, which may be called pulse-type wrong points, and the other is dense, which may be called Electrocardiograph(ECG)-type wrong points. In this example, $\hat{x}_0^+$ takes the same value as the starting point of the sequence, and $P_0^+$, $F_{k-1}$, $H_k$, $Q_{k-1}$ and $R_k$ all take unit values. In order to improve the accuracy of the calculation results, the smaller threshold $\chi$ is selected as 20, and then the prior information that the elevation of the wrong point is relatively low is introduced to further constrain the data set. After the parameters are set, the working process of robust Kalman filtering shown in FIG. 5 is applied to the above data and iterated for 6 times. The results are shown in FIG. 6 and FIG. 7.

As can be seen from FIG. 3, the conventional Kalman filtering method has no effect on the pulse-type wrong points in the range of 0-200 m, about 600 m and about 1200 m. As can be seen from FIG. 4, the general robust Kalman filtering method has made a little progress, and also has a certain effect on ECG-type wrong points in the range of 200-400 m and 800-1000 m, but there is still a big error in the whole. As can be seen from FIG. 6, the working process of robust Kalman filtering may play a role on the above two types of wrong points. Using the working process of robust Kalman filtering, the surface elevation curve with high reliability may be recovered from the original elevation data with complex wrong points. As can be seen from FIG. 7, in detail, the processing result of the working process of robust Kalman filtering is also satisfactory.

The application discloses an estimation method of detecting elevation by semi-airborne electromagnetic method, which mainly includes the following steps: (1) the original elevation data are judged by using a judging index based on Mahalanobis distance to obtain a wrong point data set; (2) bilateral judgment of the wrong point is carried out, and the results of bilateral judgment are fused, and the data set obtained by judgment may be further constrained by using the prior information; (3) the adjusted Kalman filtering method is used for wrong points, and the conventional Kalman filtering method is used for normal data; (4) the strategy of bilateral filtering is used, and the results of bilateral filtering are fused to improve the accuracy of estimation. The elevation estimation method disclosed in this embodiment realizes the effective estimation of surface elevation under the background of poor quality of original elevation data and few references, and lays a good data foundation for subsequent data processing and inversion interpretation.

The above is only the preferred embodiment of this application, but the protection scope of this application is not limited to this. Any change or replacement that may be easily thought of by a person familiar with this technical field within the technical scope disclosed in this application should be included in the protection scope of this application. Therefore, the protection scope of this application should be based on the protection scope of the claims.

What is claimed is:

1. An estimation method of detecting elevation by a semi-airborne electromagnetic method, comprising
S1, judging original elevation data to obtain wrong point data and normal data;
wherein judging the original elevation data comprises:
judging the original elevation data according to orders of from a first to a last and from the last to the first of a survey line by using a judging index method based on a Mahalanobis distance, and respectively obtaining wrong point data sets $A^{forward}$ and $A^{inverse}$;
wherein a judging index based on the Mahalanobis distance is:

$$\tilde{y}_k = ((\tilde{y}_k - \hat{y}_k^-)^T (P_{\hat{y}_k}^-)^{-1}(\tilde{y}_k - \hat{y}_k^-))^2 = (\tilde{y}_k - \hat{y}_k^-)^T (P_{\hat{y}_k}^-)^{-1} (\tilde{y}_k - \hat{y}_k^-)$$

wherein $\tilde{y}_k$ is the judging index, $\tilde{y}_k$ is an actual measured value of the elevation, $\hat{y}_k^-$ is a predicted measured value of the elevation, and $P_{\hat{y}_k}^-$ is a covariance of $\hat{y}_k^-$;
fusing the wrong point data sets $A^{forard}$ and $A^{inverse}$, taking an intersection of the two data sets as the wrong point data, and taking data except the wrong point data in the original elevation data as the normal data;
S2, filtering the wrong point data by an improved Kalman filtering method, and filtering the normal data by a conventional Kalman filtering method;
wherein the improved Kalman filtering method is:

$$\overline{P}_{\hat{y}_k}^- = \kappa_k P_{\hat{y}_k}^-$$
$$P_k^+ = (I - K_k H_k) P_k^- (I - K_k H_k)^T + K_k \overline{R}_k K_k^T$$
$$\kappa_k = \begin{cases} 1 & \text{if } \tilde{\gamma}_k \leq \chi \\ \left(\dfrac{\tilde{\gamma}_k}{\chi}\right)^n (n = 1, 2, 3 \ldots) & \text{else} \end{cases}$$
$$\overline{R}_k = \overline{P}_{\hat{y}_k}^- - H_k P_k^- H_k^T = (\kappa_k - 1) H_k P_k^- H_k^T + \kappa_k R_k$$

wherein $\overline{P}_{\hat{y}_k}^-$ is a covariance of an adjusted observation and prediction value, $k_k$ is an adjusting coefficient, $P_k^+$ is a covariance of a posterior estimation value, $K_k$ is a Kalman filtering coefficient, $H_k$ is an observation matrix, $P_k^-$ is a covariance between a real value and a prediction value, $\overline{R}_k$ is a calculated auxiliary parameter of $P_k^+$, $K_k^T$ is a transposition of the Kalman filtering coefficient, $\tilde{y}_k$ is the judging index, $\chi$ is a preset threshold, $H_k^T$ is a transposition of the observation matrix, and $R_k$ is a covariance of an observation noise matrix;
S3, fusing a filtering result of the wrong point data and a filtering result of the normal data, and taking a fused result as a measured value sequence used in a next working process; and S4, repeating the S1-S3 until the fused result meets preset requirements, and completing an effective estimation of a surface elevation.

2. The estimation method of detecting elevation by the semi-airborne electromagnetic method according to claim 1, wherein obtaining the wrong point data sets comprises:
   judging the original elevation data by using the judging index method based on the Mahalanobis distance to obtain a judging index result;
   comparing the judging index result with a preset threshold, and when the judging index result is greater than the preset threshold, marking an original datum corresponding to the judging index result greater than the preset threshold as a wrong point to obtain an initial wrong point data set;
   performing a constraint processing on the initial wrong point data set to obtain the wrong point data sets.

3. The estimation method of detecting elevation by the semi-airborne electromagnetic method according to claim 1, wherein fusing the filtering result of the wrong point data and the filtering result of the normal data comprises:
   by using the improved Kalman filtering method, filtering the wrong point data according to orders of from the first to the last and from the last to the first of the survey line respectively to obtain a first filtering result and a second filtering result, respectively;
   by using the conventional Kalman filtering method, filtering the normal data according to orders of from the first to the last and from the last to the first of the survey line respectively to obtain a third filtering result and a fourth filtering result;
   forming a first set $\hat{X}^{forward}$ based on the first filtering result and the third filtering result;
   forming a second set $\hat{X}^{inverse}$ based on the second filtering result and the fourth filtering result;
   fusing and averaging the first set and the second set to obtain the fused result $\hat{X}^{avg}$.

* * * * *